Feb. 7, 1939. C. A. WULF 2,146,411
SURFACE DECORATING MACHINE
Filed Oct. 2, 1936
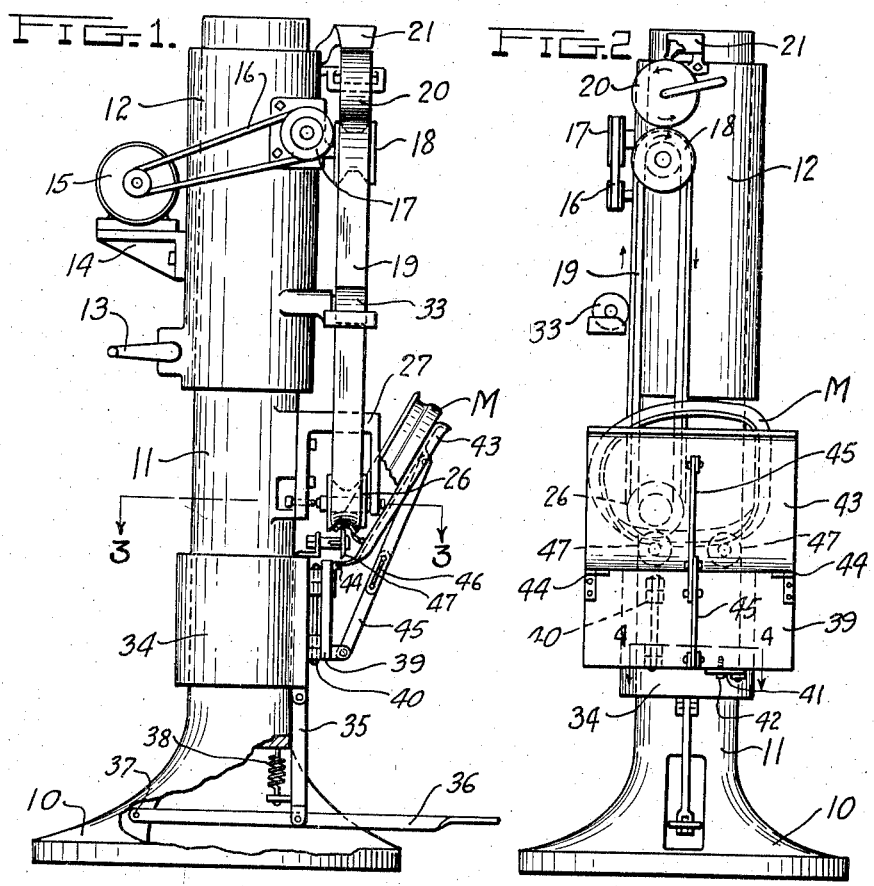
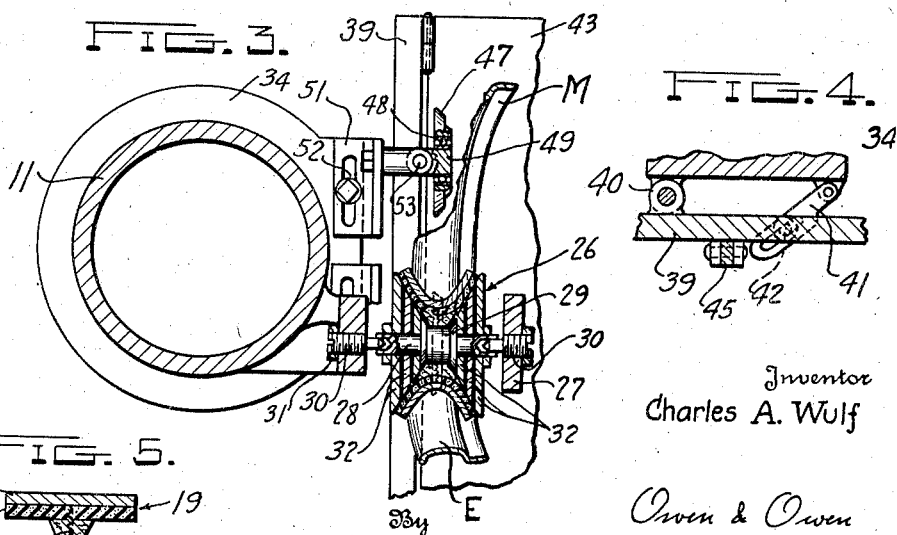
Inventor
Charles A. Wulf
By Owen & Owen
Attorney Patented Feb. 7, 1939

2,146,411

UNITED STATES PATENT OFFICE 2,146,411

SURFACE DECORATING MACHINE

Charles Arthur Wulf, Indianapolis, Ind.

Application October 2, 1936, Serial No. 103,699

23 Claims. (Cl. 101—35)

This invention relates to surface decorating machines, but more particularly for applying decoration such as a wood-graining finish to articles such as metal moldings for windows of vehicles, and an object is to produce a practical and efficient machine of this character which will enable such finishes to be applied expeditiously and economically on a production basis.

Another object is to produce a machine which is adapted to receive pigment of a definite predetermined pattern and apply same to the curved or irregular surface of an article in such manner as to produce a clear cut reproduction free from smudging and other imperfections.

A further object is to produce a simple and efficient machine for applying a finish as, for example, to stimulate wood grain on a continuous or one-piece metal molding for automobile windows or the like which is adapted more accurately and efficiently to accomplish the work with a minimum of time and labor.

Other objects reside in details of construction, operation and design which will hereinafter more fully be pointed out, and, by way of illustration, an embodiment of the invention is shown on the accompanying drawing in which Fig. 1 is a side elevation of a machine for applying a wood grain finish or the like to moldings for automobile windows with a portion of the base broken away to show a treadle arrangement; Fig. 2 is a side elevation showing another side of the machine shown in Fig. 1; Fig. 3 is an enlarged transverse sectional view on the line 3—3 of Fig. 1; Fig. 4 is an enlarged detailed sectional view on the line 4—4 of Fig. 2, and Fig. 5 is an enlarged transverse sectional view of the pigment-receiving belt.

Illustrated embodiment of the invention comprises a machine for applying a wood grain finish to moldings for automobile windows, and is provided with a base 10 from which rises a vertical cylindrical support 11. Mounted on the upper portion of the support 11 is a sleeve 12 which is adjustable in any suitable manner by a crank arm 13 which is adapted to raise or lower the sleeve 12 relative to the support 11 and lock the same in the adjusted position. Secured to the sleeve 12 is a bracket 14 on which is mounted an electric motor 15 which is connected by a belt 16 to a sheave 17. The sheave 17 is suitably connected to driving belt roller 18 which is generally of hourglass form. Trained about the roller 18 is an endless belt 19 which is adapted to receive the pigment from a roller 20, the surface of which is suitably etched or formed into the pattern which it is desired be reproduced on the molding.

In the drawing is shown diagrammatically a pigment container 21 as a means for applying a thin film of pigment to the surface of the roll 20 as the latter rotates. Other means may be employed for applying the pigment to the belt 19 as, for example, an endless belt half-tone stencil screen, or a stencil screen wrapped about a roller with suitable means for forcing the pigment through the opening. It will be therefore understood that the roller 20 with the pigment-applying device is merely diagrammatically shown, in order that the operation of the machine can more readily be understood.

The belt 19 in this instance has an outer layer 22 of a glue and gelatin composition providing a smooth, soft pigment-receiving surface, which may be readily cleaned and is of the character used to a large extent in printing work. The layer 22 is adhesively connected to a sponge rubber layer 23 of substantially the same width and thickness. Secured to the inner side of the layer 23 as by stitching 24 is a V belt 25 of leather or some other suitable material which has relatively no stretching qualities. It is important that the side portions of the belt 19 be enabled to flex laterally in order completely to cover the desired surface and also to flex longitudinally to avoid wrinkling, as will be more fully described hereinafter. Furthermore, the belt 19 must be restrained from stretching in a longitudinal direction to avoid distortion of the design.

The lower end of the belt 19 is trained about a similar roller or sheave 26 which is mounted in an inverted U-shaped bracket 27 suitably fixed to the cylindrical support 11. As shown most clearly in Fig. 3, each of the rollers or sheaves 18 and 26 are of hourglass shape and consist of a shaft 28 on which is fixed a spool 29. On opposite ends of the shaft 28 are bearing sockets to receive the reduced ends of set screws 30, a lock nut 31 in each instance holding the screw in place. It will thus be seen that the shaft 28 can float axially so that the guide roller can accommodate itself automatically to the work.

Rotatable on the shaft 28 on each side of the spool 29 are three discs 32 which increase in size from the innermost disc to the outermost disc. The number of discs may be varied and they are adapted to rotate independently of each other for the purpose of enabling one portion of the belt to move a little slower or a little faster than an adjacent portion. This prevents buckling of the belt which can flex at the side portions longitudinally as well as laterally. The structure insures that the pigment will be properly transmitted to all portions of the molding.

The arrows on Fig. 2 indicate the direction of movement of the belt and it will be noted that on the side of the belt passing to the pigment-applier is disposed a cleaner roll 33 which may rotate in a bath of naphtha thereby entirely to clean the pigment-receiving surface of any pigment, prior to receiving the next application.

Slidably mounted on the cylindrical support 11 below the sleeve 12 is a sleeve 34 which is connected by a link 35 at the lower end thereof to a treadle 36 which is pivoted inside the base 10 at 37. A coil spring 38 yieldingly urges the sleeve 34 upwardly toward the belt 19 but when it is desired to move the sleeve 34 and its associated parts away from the belt 19, this may be readily accomplished by depressing the treadle 36.

The sleeve 34 carries the parts for guiding and supporting the article to be decorated, in this instance an automobile molding M. As shown, a vertically disposed panel 39 is pivotally mounted nearer the left-hand end thereof (Fig. 2), to swing on a vertical axis, a hinge 40 being provided to connect the panel to the sleeve 34. To hold the panel 39 in its adjusted position, a slotted arm 41 is pivoted to the sleeve 34 at one end, the slot in the opposite end being engaged by a screw 42 secured to the lower end of the panel. This mounting enables angular adjustment of the panel 39 about a vertical axis. Hingedly connected to the upper edge panel or support 39 for swinging movements about a horizontal axis is a panel 43 against which the molding M is adapted to rest, the panel 43 being connected to the support panel 39 by hinges 44. To enable the panel 43 to be adjusted relatively to the supporting panel 39, an extensible rod 45 is pivoted at one end to the panel 43 and at the opposite end to the lower edge portion of the panel 39; a bolt and slot connection 46 between the parts of the rod 45 enable such adjustment to be effected.

The molding M is supported in a vertically inclined position by the panel 43 and its lower edge portion rests on a pair of rollers 47 which are spaced horizontally from each other as indicated in Fig. 2. As shown in Fig. 3, each of the rollers comprises a rotatable disc mounted on ball bearings 48, the inner race of which is secured to an arm 49, the end portion of which is flattened to extend into a slot disposed in a post 50 which projects laterally from a bracket 51 having a bolt and slot connection 52 with the upper edge portion of the sleeve 34 to enable adjustment of each roller in a horizontal direction. The pivot pin 53 connects the arm 49 and post 50 and the arrangement is such that the arm 49 can pivot freely relative to the post 50 about a vertical axis. It will be understood that the rollers 47 are thus mounted independently of each other and are freely rotatable on a horizontal axis and can swing independently of each other on a vertical axis.

It will be observed that the molding M is of a construction now in use on automobiles for the windows in the doors and elsewhere and is of sheet metal. The exposed surface of the molding M which is to be decorated is indicated generally at E in Fig. 3, which shows that surface to be rounded but may not be a true arc. Furthermore, as indicated in Fig. 2, the molding is not round but of irregular shape, the surfaces merging into each other by curved lines, the curvature of which varies materially. More detailed description of the molding M is not considered necessary because it is well known to those skilled in this art.

The operation of the machine will be apparent from the above description, but will be summarized as follows:—

As above explained, this machine is particularly adapted for wood-graining the exposed surface of molding of the above description. The pattern of the wood-grain will be disposed on the roller 20 or whatever means is used for that purpose and as the belt 19 travels, the pigment will be transferred to the smooth exterior surface of the belt in a continuous manner progressively as the parts move. The positioning of the molding M with respect to the belt is important. It is first placed against the panel 43 so that the surface to be decorated is disposed directly beneath the belt sheave 26 and the underside of that surface rests upon the rollers 47. The panel 43 is then adjusted about its horizontal axis (hinges 44) so that the exposed surface E is positioned relative to the smooth surface of the belt 19 so that the angles formed by the downwardly curved portions of the surface E and the belt on opposite sides of the high point of the molding will be equal. This is important to prevent one side of the belt from wiping relatively to the molding, and thereby smudging or otherwise damaging the pigment deposit. After the proper position is determined with the sleeve 34 lowered slightly by the treadle 36, the extensible rod 45 is tightened to securely hold the panel 43 in place.

The next adjustment to be made is the adjustment of the panel 43 about its vertical axis (hinge 40) so that the belt 19 will not run off the molding M, particularly at the corner portions. This is important to insure that the belt 19 will follow the contour of the molding particularly at the corner portions. This adjustment is a very slight one and would readily be determined empirically.

The treadle 36 is then released and the motor 15 started. The operator will move the molding M along the rollers 47 as the belt 19 travels, the rollers 47 moving relatively to each other at the bends in the molding and thereby accommodate themselves automatically to the contour of the molding.

Suitable adjustment may also be provided if desired, for adjusting the position of the panel 39 toward and away from the sleeve 34 to accommodate different size moldings or other pieces to be decorated.

It will be understood that the pigment deposited upon the belt 19 will be thereafter transmitted to the exposed surface E of the molding M, the belt sheaves 18 and 26 being so designed as to prevent one side of the belt from creeping relatively to the other, and enabling one side of the belt to move slightly slower or faster than another portion. The driving V belt 25 prevents longitudinal stretching of the belt, but as will be seen in Fig. 3, the belt can flex freely in a lateral direction about a stitching 24 as a pivot, one side being adapted to flex independently of the other, thereby to insure that the ink is properly deposited on the molding. In addition, slight flexing of the side portions of the belt in a longitudinal direction will also take place in the region of the work.

Although the embodiment of the invention has been described in connection with automobile window moldings, it can be used elsewhere to advantage. For example, ceramic articles, such as plates, can be decorated by a machine of this character, ceramic color with binders being employed in that connection. In that connection, the belt sheaves would not be of hourglass shape but somewhat barrel shaped. In fact, the machine is adapted for decorating most articles which have a substantially uniform cross section, so far as the surface to be decorated is concerned, regardless of the curves or bends which such surface may possess. It should also be mentioned that more than one color can be deposited on the belt and satisfactorily transmitted by it to the article.

It is to be understood that numerous changes in detail of construction, arrangement and operation may be effected without departing from the spirit of the invention, especially as defined in the appended claims.

What I claim is:

1. A surface decorating machine comprising a movable pigment-receiving belt adapted to flex laterally but inextensible longitudinally except at the side edge portions, and means for supporting an article to be decorated at an inclined angle with respect to the belt and in frictional engagement therewith, thereby to transfer the pigment from the belt to the article upon progressive movement of the belt and article.

2. A surface decorating machine comprising a movable pigment-receiving belt adapted to flex laterally but inextensible longitudinally along the central portion thereof, and means for supporting an article to be decorated at an inclined angle with respect to the belt and in frictional engagement therewith, thereby to transfer the pigment from the belt to the article upon progressive movement of the belt and article, said supporting means being adjustable for varying the position of the article relative to the belt.

3. A surface decorating machine comprising an endless belt having side edge portions flexible laterally and longitudinally and adapted to receive pigment in a predetermined pattern, adjustable guide means for the article to be decorated, and article supporting means automatically adjustable to compensate for changes in the contour of the article.

4. A surface decorating machine comprising an endless belt adapted to receive pigment on the exterior surface thereof in a predetermined pattern, means to impart movement to the belt, a guide and a supporting unit for the article to be decorated, said unit including separate supporting and guiding elements, means to adjust the guiding element with respect to the supporting element, a mounting for the supporting element enabling same automatically to compensate for variations in the contour of the article, and means for yieldingly urging said unit towards said belt.

5. A machine for decorating exposed surfaces of an article disposed angularly with respect to each other comprising a pigment-receiving carrier flexible laterally but inextensible longitudinally with respect to the central portion thereof, a mounting for the carrier enabling lateral flexing during advancing movement thereof, an article guide for disposing same in contact with the carrier progressively to receive the pigment from the carrier, means for adjusting said guide to position the article in such manner that the angularly disposed portions thereof are engaged by opposite side portions of the carrier.

6. A machine for decorating the surface of an article in which portions thereof are disposed at an angle to each other, comprising an endless belt the side edge portions of which are adapted to flex relative to the central portion thereof, a pair of guide rollers spaced from each other adapted to support the article in engagement with the belt, and a mounting for each roller enabling same to compensate automatically for variations in the contour of the article during the traversing movement thereof.

7. A machine for decorating the surface of an article in which portions thereof are disposed at an angle to each other, comprising an endless belt the side edge portions of which are adapted to flex relative to the central portion thereof, a pair of guide rollers spaced from each other adapted to support the article in engagement with the belt, and a mounting for each roller enabling same to compensate automatically for variations in the contour of the article during the traversing movement thereof, said roller mounting consisting of a pivotal connection enabling swinging movement thereof about an axis parallel with the longitudinal movement of the belt.

8. A machine for decorating the surface of an article having portions disposed in different planes, comprising a pigment-receiving carrier flexible laterally but inextensible longitudinally with respect to the central portion thereof, means to impart advancing movement to the carrier, and means to position the article for contact with the carrier and enable the latter to flex into engagement with the portions thereof in different planes, the article being adapted to be moved during the advancing movement of the carrier to present progressively new spaces to be decorated, said positioning means including a support against which the article is adapted to engage and which is mounted to compensate automatically for differences in the contour of the article thereby to maintain the article in pigment-receiving position relative to the carrier.

9. A surface decorating machine comprising a movable pigment-receiving belt adapted to flex laterally, but inextensible longitudinally except for the side edge portions thereof, means for supporting an article to be decorated at an inclined angle with respect to the belt and in frictional engagement therewith, thereby to transfer the pigment from the belt to the article upon progressive movement of the belt and article, and a guide roller for said belt juxtaposed to said supporting means and around which said belt passes, said roller having a plurality of sections rotatable independently of each other.

10. A machine for decorating the exposed surface of a continuous molding for vehicle windows in which the corners are curved and the exposed surface has portions disposed at an angle to each other, said machine comprising an endless pigment-receiving belt flexible laterally and longitudinally relative to the longitudinal center but inextensible longitudinally along the central portion, a molding guide along which the molding travels, said guide being mounted automatically to compensate for differences in the contour of the molding, and means to support molding at an inclined angle relative to the belt to enable flexing of the belt to engage the angularly disposed portions thereof.

11. A machine for decorating the exposed surface of a continuous molding for vehicle windows in which the corners are curved and the exposed surface has portions disposed at an angle to each other, said machine comprising an endless pigment-receiving belt flexible laterally relative to the longitudinal center but inextensible longitudinally except at the side edge portions, a molding guide along which the molding travels, said guide being mounted automatically to compensate for differences in the contour of the molding, means to support a molding at an inclined angle relative to the belt to enable flexing of the belt to engage the angularly disposed portions thereof, and an adjustable mounting for the supporting means thereby to enable the angles between the molding and the belt to be varied and also to enable adjustment of the supporting means in a plane at right angles to the plane of said first adjustment to militate against the belt running off of the molding at the corner portions thereof.

12. In a machine of the class described, a pigment-receiving belt having a non-stretchable driving portion, and a pigment-receiving portion freely flexible laterally relative to the driving portion, the flexible portions thereof being disposed on opposite sides of the driving portion.

13. A machine for decorating the surface of an article having portions disposed at an angle to each other, said machine comprising a pigment-receiving endless carrier having a longitudinally inextensible driving portion and portions on opposite sides of the driving portions freely flexible laterally and longitudinally, and a guide sheave for said belt having a plurality of independently movable sections.

14. In a machine for decorating articles, an endless pigment-receiving belt having a non-extensible driving portion and a laterally and longitudinally flexible side portion, and a guide sheave over which one end of said belt is trained, said sheave having portions automatically adjustable to enable the belt to accommodate itself to varying surfaces of the article being decorated.

15. In a machine of the character described, an endless pigment-receiving belt readily flexible at a side edge portion in longitudinal and lateral directions, a substantially inextensible driving portion, thereby to maintain the pigment on the belt in the desired position and enable same to be applied accurately without distortion to an article, means for supporting said belt including a guide sheave for one end thereof shaped to accommodate the article to be decorated, and means to support an article in the region of said sheave and beneath said belt, said supporting means including guide members automatically adjustable relatively to each other to compensate for irregularities in the contour of the article.

16. In a machine for decorating articles, an endless pigment-receiving belt readily flexible at a side edge portion in longitudinal and lateral directions, and a strip of substantially inextensible material on said belt away from said side edge portion providing the driving surface therefor, thereby to hold the pigment on the belt in the desired position in operation thereof.

17. In a machine for decorating articles, the combination of means to apply a design in endless continuity and in film formation of predetermined thickness, an endless pigment receiving belt having an inextensible driving portion and a portion flexible longitudinally and laterally adapted to receive said design, means to support an article in rolling line contact with said belt, means to impart movement to the belt, and guide means for the belt adjustable automatically to accommodate itself to the surface of the article being decorated.

18. In a machine for decorating articles, the combination of means to apply a design in endless continuity and in film formation of predetermined thickness, an endless pigment receiving belt having an inextensible driving portion and a portion flexible longitudinally and laterally adapted to receive said design, means to support an article in rolling line contact with said belt, means to impart movement to the belt, and guide means for the belt shiftable axially to accommodate itself to the surface of the article being decorated.

19. In a machine for decorating articles, the combination of means to apply a design, a pigment receiving member having an inextensible driving portion and a portion flexible longitudinally and laterally adapted to receive said design, means to position an article in rolling line contact with the flexible portion of said member, means engageable with said driving portion to impart movement to said member, and means engageable wtih said flexible portion and automatically adjustable to accommodate the surface of the article being decorated.

20. For use in a machine adapted for decorating articles having impervious surfaces, a pigment applying member comprising a portion flexible longitudinally and laterally and adapted to receive the pigment, an inextensible driving and guiding portion associated with the flexible portion, and exposed guiding surfaces on said last mentioned portion for opposing lateral displacement of the member in opposite directions.

21. For use in a machine adapted for decorating articles having impervious surfaces, a pigment applying member comprising a portion flexible longitudinally and laterally and adapted to receive the pigment, and an inextensible portion associated with the flexible portion and functioning solely in driving and guiding the member.

22. A structure of the character defined in claim 21 further characterized in that the flexible portion comprises a flexible pigment receiving ply and a resilient compressible backing for said pigment receiving ply.

23. The structure defined in claim 21 further characterized in that the flexible portion comprises a flexible pigment receiving ply and a sponge rubber backing for said pigment receiving ply.

CHARLES ARTHUR WULF.